April 11, 1961
H. C. MOUWEN
2,979,400
POROUS MEDIA
Filed Feb. 4, 1959
2 Sheets-Sheet 1
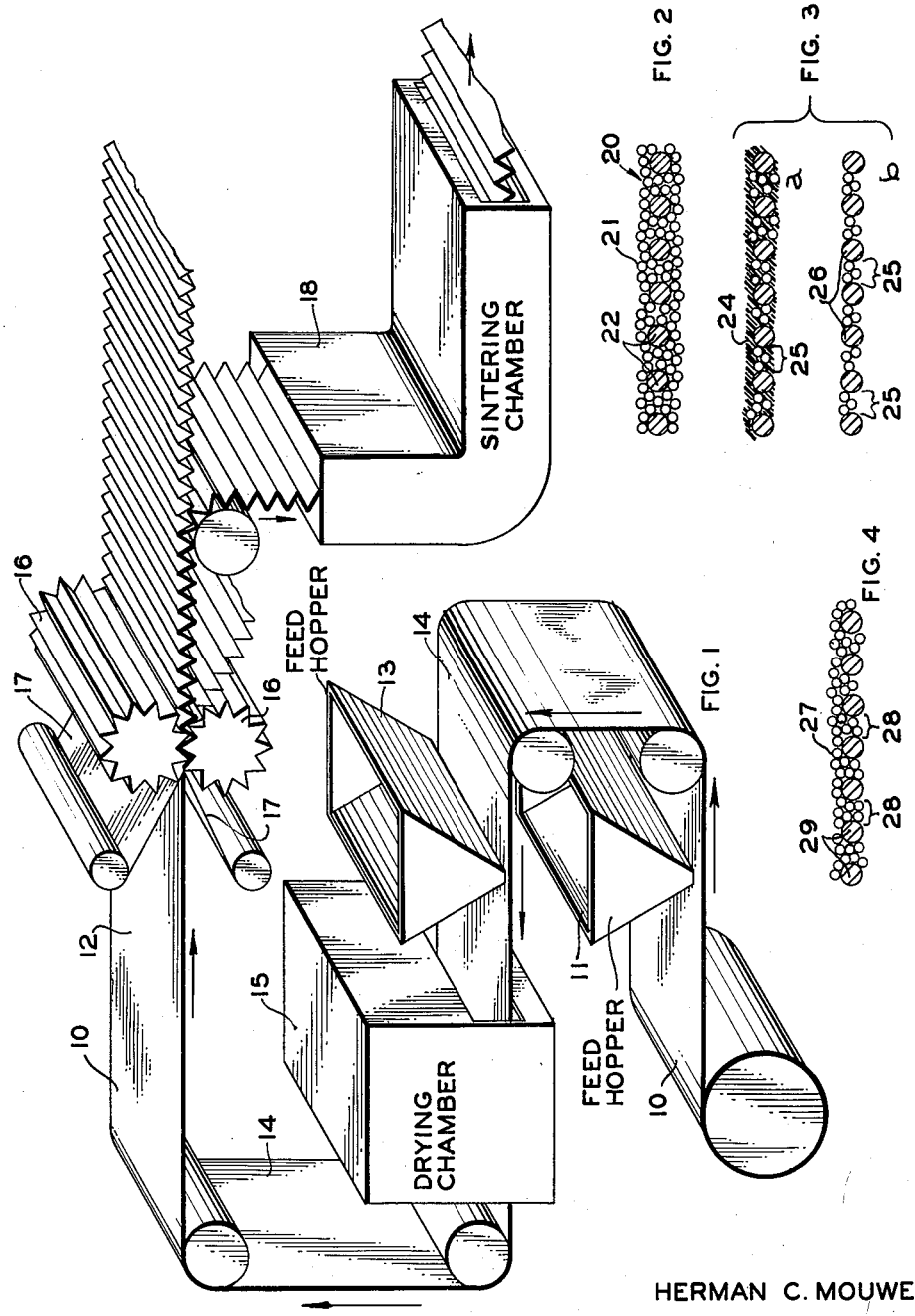
HERMAN C. MOUWEN
INVENTOR.
BY Lawrence J. Winter
ATTORNEY April 11, 1961 H. C. MOUWEN 2,979,400
POROUS MEDIA
Filed Feb. 4, 1959 2 Sheets-Sheet 2
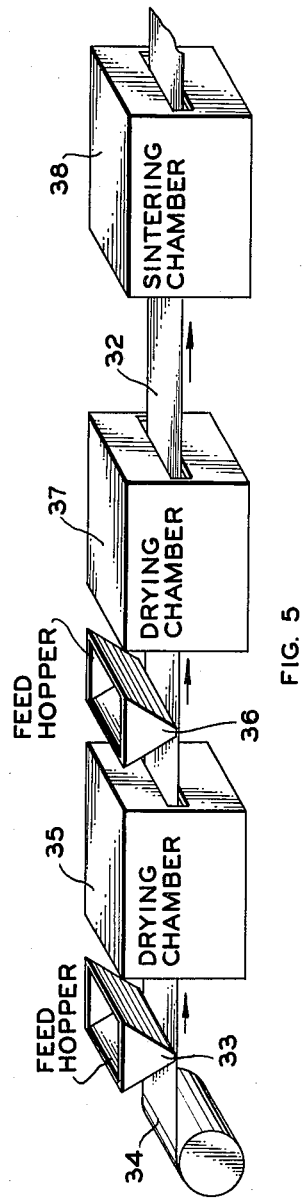
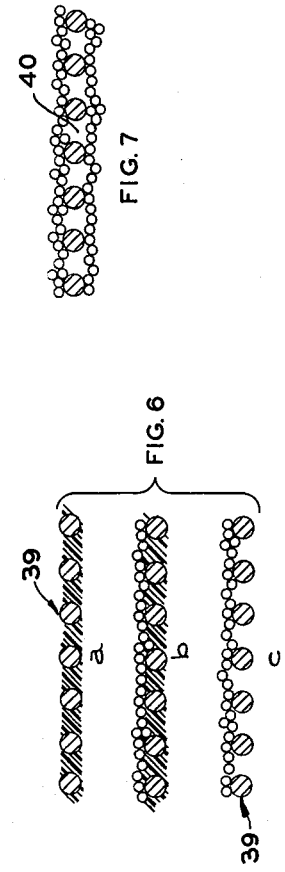
HERMAN C. MOUWEN
*INVENTOR.*
BY Lawrence J. Winter
ATTORNEY

United States Patent Office 2,979,400
Patented Apr. 11, 1961

2,979,400

POROUS MEDIA

Herman C. Mouwen, Elberon, N.J., assignor to Purolator Products, Inc., Rahway, N.J., a corporation of Delaware Filed Feb. 4, 1959, Ser. No. 791,097

6 Claims. (Cl. 75—222)

The present invention relates to a porous metal article and a method of making the same and more particularly to a porous metal article to be used as a filter.

This is a continuation-in-part of copending patent application Serial Number 625,327, filed November 30, 1956, inventor Herman C. Mouwen.

An object of the present invention is to provide a porous article which has a high mechanical strength and therefore may be utilized in a filtering system operating under a high pressure range.

Another object of the present invention is to provide an economical method of applying a continuous phase of powdered metal particles to a conventional wire mesh or screen to form a filter medium having a porosity of micron size.

A further object of the present invention is to provide a method of manufacturing a porous article comprising metal powder particles and a conventional wire mesh or screen whereby the component parts thereof form an integral filter of high mechanical strength which may be used with highly corrosive liquids and acids which would ordinarily disintegrate a filtering medium made of paper compound or non-durable materials.

The present invention further has in view the object of producing a porous metal filtering medium having a uniform porosity of micron size and which is sufficiently ductile and resilient in its final state before sintering so as to be readily formed into any desired shape or configuration.

In accordance with the present invention, a metallic filtering medium is made by applying a continuous phase or mixture of a metal powder, and plastic binder with or without solvent to a wire mesh or screen, removing the solvent from the mixture, if used, and thereafter volatilizing the binder and sintering the unit in a controlled atmospheric furnace to produce a continuous porous medium of uniform micron size.

The invention will be better understood from the following description when considered in connection with the accompanying drawings forming a part thereof and in which:

Fig. 1 is a diagrammatic view illustrating one method of making the porous metal filtering medium of the present invention, Fig. 2 is a detail view of one embodiment of a porous metallic medium made by the method shown in Fig. 1, Fig. 3 is a detail view of another embodiment of a porous metallic medium made by the method shown in Fig. 1, Fig. 4 is still another modification of a porous metallic medium produced by the method shown in Fig. 1, Fig. 5 is a diagrammatic view illustrating another method of carrying out the invention shown in Fig. 1, Fig. 6 is a detail view of a porous metal medium made by the method shown in Fig. 5, and Fig. 7 is a detail view of another embodiment of a porous metal medium made by the method of the invention shown in Fig. 5.

Referring to Fig. 1, the reference numeral 10 designates a roll of fine wire mesh or screen carried on rollers and passed through various steps in making the porous metal filtering media of the present invention, in the direction indicated by the arrows in the drawing.

The wire mesh or screen generally used is standard 100 x 100 per inch stainless steel woven mesh which has an open area of approximately 49% through to finer sizes such as 200 x 200 for example, having an open area of approximately 36%, or 250 x 250 with an open area of approximately 33%. These screens are generally in the thickness range of .006 inch although narrower gauge screen may be used if desired.

The plastic material used is a base resin of the class identified by the generic term polymerized mono-olefinic compounds and polymerized mono-ethylenically unsaturated compounds. Of particular importance in this group are resins such as polybutene, polyisobutylene, polystyrene, polyacrylate, polymethacrylate, polyethylene, polypropylene, polyvinylbutyl ether. These materials depolymerize and distill without residue of any kind so that no carbonization of the material results but there is a decomposition into gaseous constituents.

When solvents are employed they must be capable of dissolving the synthetic resin and are in general, volatile aromatic hydrocarbons, toluene, xylene and homologs, naphthas, etc.

Examples of powdered metal used in carrying out the invention are iron, cobalt, nickel, chromium, titanium, zirconium, manganese, copper, aluminum, lead, silicon, molybdenum, tungsten, zinc, tin, beryllium, and magnesium and alloys containing two or more thereof, for instance, brass, bronze, Monel metal, stainless steel and the like.

The particle size of the metal powder may vary with a particle size ranging from 80 mesh to minus 325 mesh.

Initially, the roll of wire mesh is passed below a feed hopper 11 containing a mixture of binder, solvent and powdered metal which has been previously thoroughly mixed into a homogeneous mass.

A layer of the mixture in hopper 11 is fed on the upper side 12 of the wire mesh roll 10 as it passes by the hopper so as to form a continuous coating of uniform thickness over the complete surface thereof. The coated portion of the wire mesh screen is then passed below a second feed hopper 13, containing the same mixture as in hopper 11 and a coating of the mixture is applied to the opposite side 14 of the screen so that the screen is now coated on both sides with the viscous or plastic mixture. Thereafter, the coated portion of the wire mesh is passed through a drying chamber 15 wherein the elevated temperature therein drives off the solvent to change the plastic portion of the mixture from a viscous or liquid state to a solid state. Thereafter, the coated portion of the screen is passed between convoluting elements 16 which form longitudinally extending pleats therein. A covering of paper 17 is applied to both sides of the screen before it passes through elements 16 to prevent the plastic mixture on the screen from sticking or adhering thereto as it is convoluted. The paper is removed from the pleats or convolutions by any conventional means and the convoluted screen is then passed into the sintering chamber 18.

In the sintering chamber 18, the convoluted screen is completely covered or packed in setter material for example, aluminum oxide, to enable the coated screen and mixture thereon to retain its position during the sintering operation. Since the volatilization temperature of the plastic portion of the mixture is lower than the sintering temperature at which the powdered metal particles fuse together, it is necessary to provide means to maintain these particles positioned in contact with one another in this temperature range. Otherwise, the volatilization of the plastic portion of the mixture before the powdered metal particles fuse together would permit the particles to fall off of the screen. In the sintering chamber the temperature is gradually increased until the plastic component of the mixture begins to volatilize. This operation is accomplished in a hydrogen gas atmosphere and the temperature is maintained constant until all of the plastic material of the mixture has volatilized. Thereafter, the temperature is increased until the powdered metal particles fuse together so as to bond to one another and also to the surface of the wire mesh or screen. Thus, a porous filtering medium is produced having a minute porosity of micron size and possessing high mechanical strength because of the wire mesh backing.

Examples of specific methods of carrying out the invention are as follows:

Example I

Polyethylene batches were melted in temperature ranges between 140° C. and 180° C. until they became completely fluid. Then 10 gram batches of the fluid polyethylene were mixed with 100 grams of stainless steel powdered metal particles having a minus 325 mesh classification. The batches were thoroughly mixed to a homogeneous plastic mass by beating or agitating them for approximately 15 to 20 minutes. A 100 x 100 mesh stainless steel screen was then coated with the plastic mix to a thickness of approximately .004 inch, after which the coated screen was left alone and the polyethylene cooled or dried to a solid state after about 30 minutes. The coated screen was then run through convoluting rollers. Thereafter, the convoluted article had aluminum oxide packed around it and was placed in a sintering furnace with a hydrogen gas atmosphere and heated in temperature ranges between 400° C. and 500° C. for 6 to 8 hours completely volatilizing the polyethylene out from the mixture. The temperature of the furnace was then maintained between 1250° C. to 1300° C. for 4 to 6 hours and the metal particles sintered together and to the screen forming a porous filter medium without any resinous residue.

In other examples carrying out the invention, the same procedure set forth was followed except that the polyethylene portion of the mix was varied from 7.5 to 11 percent by weight and the powdered metal portion from 89 to 92.5 percent by weight to form the porous media.

Example II

In carrying out the invention where a solvent was used in the mix, batches of polyisobutylene, known under the trade name of Vistanex, were dissolved into toluene by agitation for approximately 480 minutes. Stainless steel powered metal of minus 325 mesh was then introduced into the polyisobutylene toluene fluid solution and the mix agitated for 15 to 20 minutes to form a homogeneous plastic mass. A batch consisted of 40 grams polyisobutylene, 180 grams powdered metal and 360 cc. toluene or approximately 312 grams. Thereafter, stainless steel 100 x 100 mesh screens were coated with a .004 inch thickness of material. The toluene was vaporized and driven off by heating at about 100° C. for 30 to 45 minutes, or by air drying for 2 to 3 hours with no application of heat. The coated screen was then convoluted, packed with alumina setter and inserted in a sintering furnace as before and heated between 3 to 6 hours at 400 to 500° C. and the polyisobutylene completely volatilized. A furnace temperature of 1250–1300° C. was then maintained for 4 to 6 hours and the powdered metal sintered together and to the screen resulting in a porous filter with no carbon residue. Other ranges of polyisobutylene used were 16 to 20 percent by weight and 80 to 84 percent powdered metal based on a solvent free basis or after all solvent was driven off.

Referring to Fig. 2, the porous metal article 20 illustrated therein is made by the method of the present invention shown in Fig. 1. Porous metal article 20 comprises a continuous layer of metal particles 21 fused or bonded to one another and to wire screen 22 forming a porous layer on opposite sides of the wire strands 23 of screen 22 and filling the spaces or openings therebetween.

Fig. 3(a) illustrates the coated screen after it has passed through drying chamber 15 of Fig. 1 to remove the solvent from the mixture when only one side of the screen is coated, for example, side 12 and the excess mixture extending above or below the thickness of the diameter of the wire strands 26 is removed by roll bars, a scraping edge, not shown, or other similar means before it enters sintering chamber 18 so that the plastic mixture 24 only fills the spaces or openings 25 between the wire strands 26 of the screen.

Fig. 3(b) shows the porous medium 24 after it has passed through the sintering chamber 18 so as to volatilize the plastic phase shown in Fig. 3(a) to produce a thin porous medium having a maximum thickness equal to the diameter of the wire screen to which the metallic particles are bonded.

Referring to Fig. 4, the porous medium 27 shown therein illustrates the medium made by the method of Fig. 1, when the continuous layer of plastic, solvent, and powdered metal mixture is applied relatively heavy and on one side only of the screen 14 so that the mixture fills the spaces 28 between the wire strands 29 of the wire screen and in addition forms a layer on one side of the screen extending above the wire strands 29 thereof.

Referring to the method of making a porous medium shown in Fig. 5, a roll of wire mesh or screen 32 is first passed under a feed hopper 33 containing a mixture of polyisobutylene and solvent, or molten polyethylene both of which are clear or translucent plastic mixtures without any powdered metal component therein. The mixture from the hopper is fed onto the upper side 34 of wire screen 32 so as to completely cover it and fill the apertures or spaces between the wire strands forming the wire mesh. This portion of the wire mesh is then passed through a drying chamber 35 to remove the solvent and change the state of the plastic mixture from a viscous or liquid state to a solid or dry state. Thereafter, the portion of screen containing the continuous film of plain or clear plastic is then passed under a second feed hopper 36 containing a mixture of polyisobutylene, solvent, and powdered metal and the mixture is fed on top of the solidified layer of plastic material to completely cover it and form a second layer thereon. The first layer or coating of clear plastic material is provided to form a surface for supporting the second coating of mixture, containing the powdered metal, so as to prevent any of the powdered metal from filling the spaces or openings between the wire strands which form the wire screen. The portion of the wire screen 32 now containing two layers of material or coating is thereafter passed through drying chamber 37 and heated to solidify the second coating of the plastic mixture applied to the screen. If desired, the screen may then be convoluted as shown in Fig. 1. The portion of plastic coated screen is next packed with a setter and passed into sintering chamber 38 wherein the temperature is gradually increased to the point where the plastic phase of the plastic and powdered mixture starts to volatilize. The temperature is maintained constant until all of the plastic medium has volatilized at which time the temperature is increased sufficiently to cause the powdered metal to bond together by fusion and also to bond to the wire screen to produce a fused porous metal medium.

Fig. 6 illustrates the porous medium made by the method shown in Fig. 5.

Fig. 6(a) depicts the wire screen 39 after it has been coated with the clear plastic and solvent mixture and dried in drying chamber 35 to remove the solvent therefrom.

Fig. 6(b) shows the screen after the mixture of plastic, solvent and powdered metal has been applied to it from feed hopper 36 and the screen has passed through the drying chamber 37 to remove the solvent therefrom.

Fig. 6(c) illustrates the porous medium after it has passed through the sintering chamber 38. Thus, this method produces a porous medium article comprising a wire screen having a continuous layer of metallic particles bonded or fused to one another, and to one side only of the wire strands of the screen without filling the spaces or openings between the wire strands, so as to form a porous layer disposed in a plane above that of the wire screen. This results in a porous medium having a thickness of .008 to .010 inch, including the thickness of the wire strands of the screen.

Referring to Fig. 7 this illustrates another porous medium formed by the process illustrated in Fig. 5. This produces a porous medium adjacent outer opposite sides of the wire strands forming the wire screen so as to form a passage 40 therebetween. Thus, this embodiment of the porous medium provides an open area within the wire screen so as to offer a path for the flow of fluids which may flow from the outer sides of the porous media inwardly, between the two coatings thereon, and vertically between the wire strands forming the wire screen. Heavier gauge screening may be used in this embodiment for example, 4 x 4 per inch wire mesh to give sufficient spacing between the layers of the mixture to form a passage. This medium resembles a filter-leaf type element which may be held together by welding or any conventional means around the perimeter or periphery of the medium.

Inasmuch as various changes may be made in the particular form, and arrangement of the article and in the steps of the process and other sequences as disclosed without departing from the principles of the invention, it will be understood that the invention is not to be limited excepting by the scope of the appended claims.

What is claimed is:

1. The method of making a convoluted porous filter article of desired configuration comprising depositing a mixture of viscous resinous material consisting of depolymerizable polymerized-mono-olefinic resin and metal powder on a screen member to form a continuous phase thereon, solidifying said resinous material, convoluting said member into the desired filter configuration, applying a setter material to said filter, and sintering said screen member to volatilize said resinous material and fuse the metal powder and screen member together.

2. The method of making a convoluted filter of desired shape comprising depositing a mixture of viscous resinous material consisting of depolymerizable polymerized-mono-olefinic resin and metal powder on a screen to fill the spaces therein and cover both sides thereof, solidifying said material, convoluting said screen into the desired filter shape, sacking said material and screen in setter material, and sintering said screen to completely volatilize said material and sinter said metal powder and screen together.

3. The method of making a convoluted filter of desired shape comprising depositing a mixture of plasticized resinous material consisting of depolymerizable polymerized-mono-olefinic resin and metal powder on a wire mesh to fill the spaces therein, solidifying said material, convoluting said mesh into the desired shape, applying setter material around said convoluted filter and sintering said wire mesh to completely volatilize said resinous material and sinter said metal powder and mesh together.

4. The method of claim 3 wherein said mixture is deposited on said wire mesh to fill the spaces therein and cover one side thereof.

5. The method of making a convoluted filter of desired shape comprising depositing a layer of plasticized resinous material consisting of depolymerizable polymerized-mono-olefinic resin on a wire mesh to fill the spaces therein, solidifying said material, depositing a mixture of said plasticized material and metal powder onto one side of said mesh, solidifying said mixture, convoluting said mesh into the desired filter shape, applying a setter material around said resinous material and mesh and sintering said mesh to completely volatilize said resinous material and sinter said metal powder and mesh together.

6. The method of claim 5 wherein said mixture is deposited on both sides of said layer.

References Cited in the file of this patent

UNITED STATES PATENTS

| | | |
|---|---|---|
| 2,457,051 | Le Clair | Dec. 21, 1948 |
| 2,593,943 | Wainer | Apr. 22, 1952 |
| 2,851,354 | Scanlan et al. | Sept. 9, 1958 |